United States Patent [19]

Smith

[11] 3,740,063
[45] June 19, 1973

[54] FLOATING TOOL HOLDER

[76] Inventor: Theodore M. Smith, 14750 Puritan Avenue, Detroit, Mich. 48227

[22] Filed: Oct. 15, 1971

[21] Appl. No.: 189,654

[52] U.S. Cl. ................................... 279/16, 408/16
[51] Int. Cl. ....................... B23c 31/04, B23b 49/00
[58] Field of Search................ 279/16, 17, 18, 1 L, 279/1 J; 10/89 F, 129, 141 H; 408/16, 11

[56] References Cited
UNITED STATES PATENTS

| 3,454,283 | 7/1969 | Benjamin et al. | 279/16 |
| 2,007,897 | 7/1935 | Skeel | 279/16 |
| 1,907,447 | 5/1933 | Schiltz | 279/16 |
| 1,241,175 | 9/1917 | Watts | 82/1.3 |

Primary Examiner—Gil Weidenfeld
Attorney—Cullen, Settle, Sloman & Cantor

[57] ABSTRACT

In a floating tool holder having a shank, a body driven thereby and an adapter assembly removably secured to and driven by said body, the improvement which includes a float disc interposed between said body and adapter assembly. A series of axial apertures extend through the disc and transverse slots are formed in opposing end faces thereof. End thrust separator balls are nested in the axial apertures for engagement with said body and adapter assembly to permit copensating lateral translation of the adapter assembly relative to said body. Drive balls are nested in the float transverse slots to project into corresponding opposed transverse slots in the corresponding inner ends of said body and adapter assembly.

8 Claims, 5 Drawing Figures

PATENTED JUN 19 1973
3,740,063
SHEET 1 OF 2

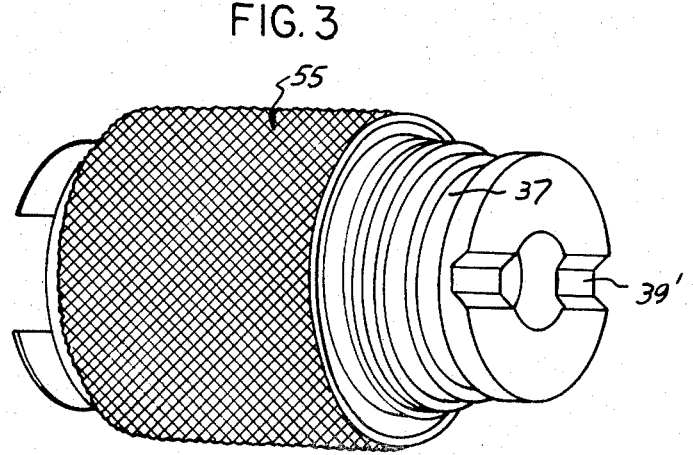
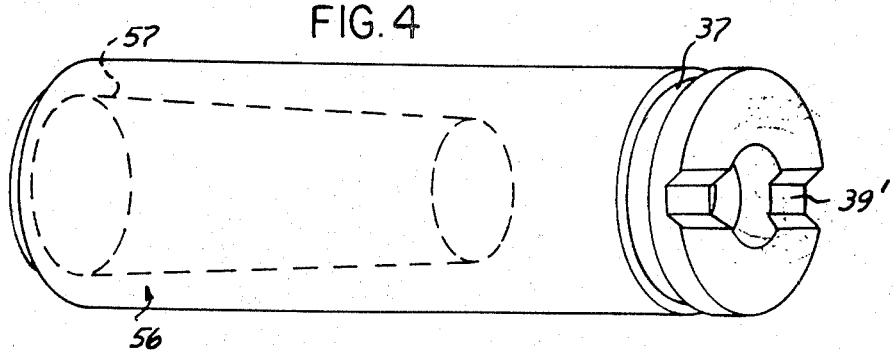
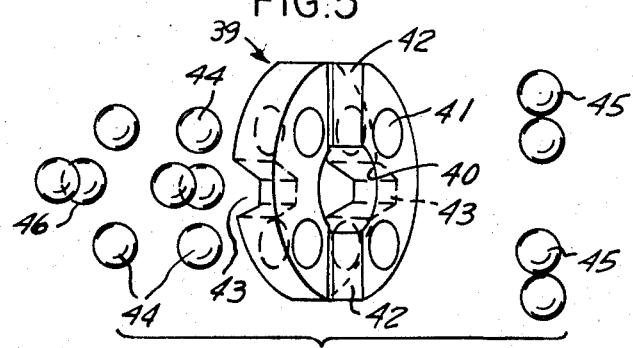

FLOATING TOOL HOLDER

BACKGROUND OF THE INVENTION

Heretofore, in the use of tool holders, these have normally included a power rotated and longitudinally fed shank which axially projects into the tool holder body driven thereby and within the free end of the body, there is removably positioned an adapter assembly of various types adapted to removably receive and secure and rotatively drive a tool holding adapter. In constructions of this type, there is often some misalignment between the longitudinal axis of the shank and body and the longitudinal axis of the hole being bored or tapped with the result that certain transverse pressures are applied to the adapter assembly, ultimately causing malfunction of the tool holder.

BRIEF DESCRIPTION OF THE INVENTION

It is an object of the present invention to provide an improved floating tool holder wherein a means is provided to removably mount adapter assembly for rotation with said body but at the same time free for lateral translation on axes parallel to the body axis to automatically compensate for misalignment between the axis of the body and the axis of the aperture being machined, tapped, drilled or reamed.

It is another object to provide an improved mounting for the adapter assembly with respect to the power rotated body wherein there is provided a floating relationship in the nature of an end thrust float mechanism which is interposed between the body and the adapter assembly. This is to permit relative lateral translation of the adapter assembly with respect to the body and which at the same time, retain driving engagement therebetween.

These and other objects will be seen from the following specification and claims in conjunction with the appended drawing.

BRIEF DESCRIPTION OF THE DRAWINGS

FIG. 3 is a perspective view of an alternately usable quick change adapter assembly adapted to receive a range of tap sizes and corresponding adapters.

FIG. 4 is a perspective view of an alternately usable morse taper adapter assembly.

FIG. 5 is a bracketed perspective view of the float disc shown in FIG. 1 with the end thrust and drive balls shown in exploded relation.

DETAILED DESCRIPTION OF THE INVENTION

Figure 1:
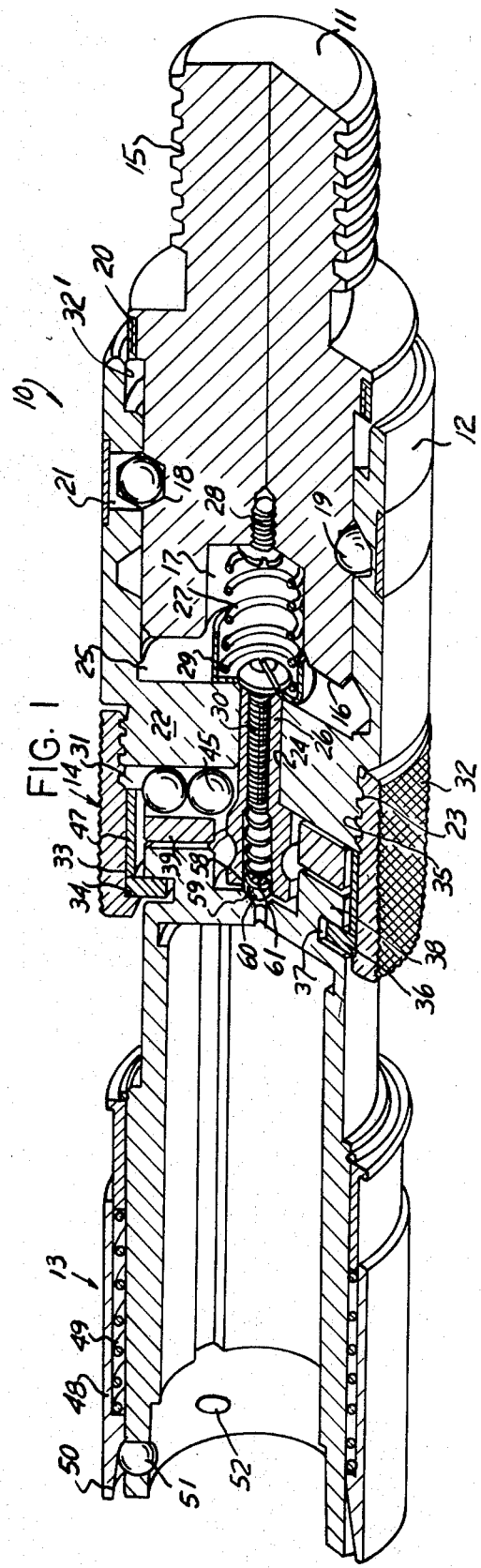
FIG. 1 is a fragmentary partly broken away longitudinal section of the present floating tool holder with one form of adapter assembly; namely, an Acme adapter assembly.

Referring to FIG. 1 there is shown partly broken away a longitudinal section of the present floating tool holder generally indicated at 10 and including power rotated and longitudinal feedable shank 11 adapted for mounting and securing within a power driven machine tool spindle of conventional construction, not shown.

The present floating tool holder also includes an elongated axially disposed body 12 which receives one end of said shank and is rotatively driven and longitudinally fed thereby. One form of adapter assembly 13 known as an Acme adapter assembly, is axially aligned normally with body 12 and is suitably secured thereto by the float cap assembly wherein the adapter assembly may be removably interlocked with the body in rotative driven relation.

The present power rotated and longitudinally feedable shank includes a threaded end portion 15 by which it is projected into and secured to a power rotated and longitudinally fed machine spindle. Its opposite end terminates in a transverse end face 16 and projecting thereinto the axial bore 17.

Intermediate the ends of the shank is an annular recess 18 adapted to receive a series of spaced balls 19. The source ring generally indicated at 20 is in the nature of a metallic ring which has been impregnated with a radioactive material and is mounted within a corresponding annular exterior recess in a portion of the shank adjacent its threaded portion.

Formed within the elongated axially arranged body 12 within which projects one end of said shank, are a plurality of elongated slots 21 which are inclined with respect to longitudinal axis of the body and are adapted to receive projecting portions of the balls 19 carried by said shank. The forward end 22 of said body is of reduced exterior diameter and is threaded at 23 and includes an axial counterbore 24. The bore of said body terminates in the radial inner end face 25 which is normally spaced from the end face 16 of said shank.

In normal operation on initial rotation of shank 11, balls 19 move in the inclined slots 21 in body 12 causing an inward movement of the shank relative to said body. This moves the source ring so as to be protectively enclosed by the recessed portion 32' in said body, FIG. 1. In the event of a malfunction, the above relative movement is prevented, causing the ring 20 to activate an electronic tool failure detection system, such as shown in applicant's U.S. Pat. No. 3,566,719 of May 2, 1971.

Centering cup 26 is snugly projected through bore 24 of said body and secured thereto and projects forwardly thereof as shown in FIG. 1. Torsion compression spring 27 also referred to as a cocking spring is nested within bore 17 of the shank and projects within the main bore of the body and bears against its inner radial wall 25 with cup shaped seat 29 interposed, and is secured to one end to the body by the elongated screw 30 threaded into the bore of centering cup 26. The opposite end of spring 27 is axially secured to the shank by anchoring screw 28.

Across the outer end face of body portion 22 there is provided a pair of aligned transverse slots 31.

Elongated exteriorly knurled float cap 32 has an internal bore 33 terminating in a retaining shoulder 34 at one end and at its opposite end is interiorly threaded at 35 for securing registry over the threaded end 22 of said body.

A pair of semicircular adapter retaining split rings 36 bear against the shoulder 34 within said float cap and extend radially and loosely into the exterior annular recess 37 on the inner end portion 38 of adapter assembly 13. The inner surfaces of the split rings extend only partly down into the adapter assembly recess 37 so that said adapter assembly is capable of lateral translation for rotation upon axes which are parallel to the body axis.

The float disc 39, shown in detail in FIG. 5, loosely receives the centering cup 26 and is interposed between the registering adjacent ends of the body and adapter assembly.

Figure 2:
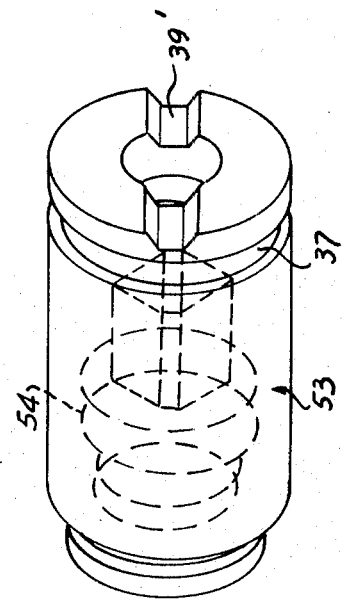
FIG. 2 is a perspective view of an alternately usable single tap holding adapter assembly.

Across the inner end face of the adapter assembly there is provided a pair of transverse radial slots 39' such as clearly shown in the various adapter assemblies of FIGS. 2, 3 and 4.

The function of the float disc 39 is to provide a means of transmitting rotational power drive between the body 12 and the adapter assembly 13 but at the same time permit the loosely mounted adapter assembly limited lateral translation movements upon axes which remain parallel to the body axis.

For this purpose said float disc, FIG. 5, is of cylindrical form with a central bore 40 and has formed therethrough a series of axial apertures 41 which are equidistantly spaced from the disc axis. Aligned transverse recesses 42 are formed across one end face of float disc 39, and a second pair of transverse aligned recesses 43 are formed across its opposite face and preferably arranged at right angles to the first transverse recesses 42.

Corresponding metal balls 44 are nested within the respective axial apertures 41 with outer portions of the balls projecting longitudinally outward of the respective apertures for cooperative end thrust bearing engagement with corresponding end face portions of the respective body and adapter assembly.

The additional pairs of drive balls 45 are nested within the float recesses 42 with portions of said balls cooperatively nesting within the corresponding transverse end slots 31 of said body, as shown in FIG. 1.

Within the oppositely arranged disc recesses 43 are the additional transversely arranged pairs of balls 46 which project longitudinally for cooperative nesting and driving engagement within the corresponding transverse slots 39' of the respective adapter assembly 13.

Thus, the float disc 39 with its respective end thrust balls 44 and drive balls 45 and 46 provide a means of transmitting rotative drive motion from the body to the adapter assembly and at the same time provide for transverse automatic adjustments of the adapter assembly so as to move into axes of rotation which are laterally displaced from and parallel to the body axis. This compensates for any misalignment between said axis and the axis of the hole being tapped or otherwise machined.

Cylindrical float spacer 47 is nested within float cap 32 and one end retainingly bears against the split retaining rings 36 and at its opposite end bears against the corresponding end face of the body.

In the illustration, FIG. 1, the end portion 38 of the adapter assembly which projects into float cap 32 is spaced radially inward from float spacer 47 so that the adapter assembly is thus capable of and free to make transverse lateral adjustments for rotation in planes parallel to the body axis.

With the adapter assembly 13 removed from the body, the float cap 32 is normally retracted from the position shown to permit the assembly of the adapter retaining split rings 36 and thereafter the float spacer 47. Thereafter the float disc is nested within the float cap and the latter is advanced and its free end is threaded over the corresponding threaded end 22 of the body, with the float disc 39 loosely receiving the centering cup 26.

The adapter assembly 13 in FIG. 1 is an Acme adapter assembly adapted to removably receive and have interlocked therewith a suitable adapter mounting a tap or other tool. In this construction, at the forward end thereof there are a series of transverse apertures 52 adapted to receive the balls 51 which in the position of the cam surface 50 of the release sleeve 48 biased outwardly by spring 49 is adapted to lock a particular tool adapter into position with its conventional key nested within the corresponding key slot formed within the adapter assmebly. To retract or withdraw the adapter for the tool it is necessary to manually retract the ball retaining sleeve 48 against the action of spring 49 so that the inclined surface 50 is retracted and the balls 51 can move laterally outward sufficiently to disengage the particular adapter. This construction forms no part of the present invention and further detail thereof is omitted.

Instead of the adapter assembly 13 in FIG. 1, this may be replaced by the adapter assembly 53 adapted to mount within its bore 54 and retain therein a single tap, not shown.

This adapter assembly also has a corresponding annular recess 37 corresponding to the adapter assembly 13, FIG. 1, adapted to receive the corresponding adapter retaining split rings 36 in the same manner as described with respect to FIG. 1; and wherein the balls 46 mounted on the float disc drivingly nest within the corresponding transverse slots 39' in the inner end face of said adapter assembly.

In FIG. 3 there is generally indicated quick change adapter assembly 55 which is adapted to removably mount a series of adapters for a range of tap sizes. Annular retaining slot 37 is the same as is also the end face transverse slots 39'.

Another type of adapter assembly is designated at 56 and has a tapered bore at 57 adapted to receive a range of Morse taper type tools. Here again, retaining recess 37 is the same and corresponding transverse end face slots 39' are the same for cooperatively receiving corresponding driven balls 46 mounted upon the inner face of float disc 39.

Thus, by the present construction a variety of adapter assemblies may be interlockingly mounted upon and with respect to the body by means of the float cap assembly 14 and utilizing the present float disc 39.

By this construction regardless of the nature of the adapter assembly employed, said adapter assembly is securely mounted in normal axial alignment with respect to the body axis, but by virtue of the construction of the float disc and the arrangement for holding the adapter assembly in position utilizing the adapter retaining rings 36 is capable for such lateral translation so that the adapter assembly can rotate on axes which are displaced from and parallel to the body axis to thus compensate for misalignment between the bore of the workpiece being machined and the body axis.

The centering cup 26 has a longitudinal bore which at one end receives the centering spring adjusting screw 30, and at its other end 58 is open. Axially disposed at the inner end of the adapter assembly is an oppositely arranged conical seat 59 with a suitable end thrust ball 60 or centering ball interposed and engaging seat 59. The centering spring 61 is nested within the centering cup bore and is interposed between the adjusting screw 30 and ball 60 to normally bias the ball against cone shaped seat 59.

By this construction, in the event that there are transverse forces due to nonalignment of the bore of the workpiece being machined or tapped and the body axis, any lateral translation of the adapter assembly will in effect cause a riding up of portions of the ball upon and with respect to the adapter assembly conical seat 59. Accordingly, when the shank has been retracted and pressure relieved, the adapter assembly will automatically realign to the position shown in FIG. 1 and thus is self aligning.

Having described my invention reference should now be had to the following claims.

I claim:

1. In a floating tool holder having a power rotated and longitudinally fed shank, a drive body coaxially mounted over one end of and drivingly engaged by and adapted for relative longitudinal movement with respect to said shank, and an adapter assembly axially aligned with and removably and drivingly connected to said body for selectively mounting one of a plurality of tool carrying adapters; the improvement comprising an apertured float cap at one end secured to said body and at its other end removably receiving said adapter assembly and securing same against relative longitudinal movement; the respective inner ends of said body and adapter assembly being transversely sloted; a float disc loosely nested within said cap having a series of axial apertures therethrough and upon its outer faces transverse right angularly related slots; separator end thrust balls movably positioned within said axial apertures and projecting outwardly of its outer faces for cooperative engagement with said body and adapter assembly; and additional balls nested in said float transverse slots and projecting axially thereof and respectively into the corresponding end transverse slots of said body and adapter assembly, for driving rotation of said adapter assembly, said float disc and adapter assembly being adapted for compensating lateral translation for rotation on axes parallel to said float axis.

2. In the floating tool holder of claim 1, the drive engagement between said shank and body including an annular groove in the shank mounting a plurality of spaced balls projecting therefrom, there being a series of inwardly opening slots in said body inclined to the body axis cooperatively receiving said balls to provide an initial longitudinal compensating movement of said shank with respect to said body and successive rotation thereof.

3. In the floating tool holder of claim 2, a torsion cocking spring axially interposed between said shank and body compressed and placed under torsion on initial relative longitudinal movement of said shank and body whereby upon release of said feed pressure and drive to said shank and retraction thereof, there will be an automatic relative longitudinal movement in the opposite direction between said body and shank.

4. In the floating tool holder of claim 2, a radioactive impregnated ring on said shank normally spaced from said body and adapted upon normal relative longitudinal movement of said shank and body to move into a shielded position within an undercut annular groove in said body.

5. In the floating tool holder of claim 1, the securing of said adapter assembly to said float cap including an annular groove in the inner end portion of said adapter assembly projecting into said float cap, and a split ring nested and retained in said cap and radially projecting loosely into said annular groove, so that said adapter assembly is free for limited lateral translation.

6. In the floating tool holder of claim 5, a float spacer in said float cap loosely receiving and enclosing said float disc and adjacent end portion of said adapter assembly and snugly interposed between said split ring and body.

7. In the floating tool holder of claim 1, the balls in said float disc axial apertures being equal distances from the float axis, there being two pair of radially extending aligned balls on each end of said float disc within its radial slots.

8. In the floating tool holder of claim 1, an elongated centering cup axially secured to and projected through said body at its inner end and loosely through said float disc and having a bore open at one end;

an oppositely arranged coaxially aligned cone shaped seat in a corresponding end portion of said adapter assembly;

a centering ball nested in said seat;

and adjustable spring means in said cup bore bearing against said ball, whereby the adapter assembly and body are normally biased into axial alignment;

said ball on relative lateral translation of said adapter assembly riding the inclined surface of said adapter assembly seat, whereby upon release of drive and feed and retraction of said shank and body, said adapter assembly automatically realigns with said body.

* * * * *

UNITED STATES PATENT OFFICE
CERTIFICATE OF CORRECTION

Patent No. 3,740,063        Dated June 19, 1973

Inventor(s) Theodore M. Smith

It is certified that error appears in the above-identified patent and that said Letters Patent are hereby corrected as shown below:

On the cover sheet insert -- [73] Assignee: Lucille G. Smith and Theodore M. Smith, Trustees of the Theodore M. Smith Trust, Detroit, Mich. --.

Signed and sealed this 26th day of February 1974.

(SEAL)
Attest:

EDWARD M. FLETCHER, JR.       C. MARSHALL DANN
Attesting Officer              Commissioner of Patents